US012659526B2

(12) United States Patent
Rao et al.

(10) Patent No.:     US 12,659,526 B2
(45) Date of Patent:          Jun. 16, 2026

(54) SYSTEMS AND METHODS FOR GENERATING HIERARCHICAL REQUEST MESSAGES FOR MEDIA PLACEMENT OPPORTUNITIES

(71) Applicant: Spotify AB, Stockholm (SE)

(72) Inventors: Aditya Madhav Rao, Edgewater, NJ (US); Aron Patrick Glennon, Cape Elizabeth, ME (US)

(73) Assignee: Spotify AB, Stockholm (SE)

( * ) Notice:     Subject to any disclaimer, the term of this patent is extended or adjusted under 35 U.S.C. 154(b) by 298 days.

(21) Appl. No.: 18/468,596

(22) Filed:     Sep. 15, 2023

(65)          Prior Publication Data

US 2025/0097488 A1     Mar. 20, 2025

(51) Int. Cl.
   *H04N 21/234*          (2011.01)
   *H04N 21/258*          (2011.01)
   *H04N 21/81*           (2011.01)
(52) U.S. Cl.
   CPC . *H04N 21/23424* (2013.01); *H04N 21/25808* (2013.01); *H04N 21/25866* (2013.01); *H04N 21/812* (2013.01)
(58) Field of Classification Search
   CPC ....... H04N 21/23424; H04N 21/25808; H04N 21/25866; H04N 21/812
   See application file for complete search history.

(56)          References Cited

U.S. PATENT DOCUMENTS

2005/0203797 A1*   9/2005   Isobe ................. G06Q 30/0273
                                                              705/14.69
2009/0328113 A1   12/2009   Van De Klashorst
2011/0035438 A1    2/2011   Henkin et al.
2015/0294364 A1   10/2015   Deshpande
2017/0099526 A1    4/2017   Hua et al.
2023/0300212 A1*   9/2023   MacTiernan ....... H04N 21/8456
                                                              705/14.66

* cited by examiner

*Primary Examiner* — Oschta I Montoya
(74) *Attorney, Agent, or Firm* — Morgan, Lewis & Bockius LLP

(57)          ABSTRACT

A computer system determines one or more media placement opportunities for a media application at a client device and generates a request message that includes an indication of each media placement opportunity. The request message has a hierarchical framework with a plurality of levels that includes, for each media placement opportunity: (i) a media application context level; and (ii) a sub-context level. The computer system transmits the request message to a server system; and receives, from the server system, a response to the request message that includes one or more media content items selected based on the information included in the hierarchical framework of the request message. The computer system provides, to the media application at the client device, at least one of the one or more media content items within at least one of the media placement opportunities.

24 Claims, 9 Drawing Sheets

Media Content
Server 104

Memory 306

CPU(s)
302

308

Network
Interface(s)

304

Operating System 310

Network Communication Module 312

Server Application Modules 314

Media Content Module 316

Request Generator Module 318

Media Placement Opportunities 320

⋮

Server Data Modules 330

Media Content Database 332

Metadata Database 334

Playback History 336

⋮

⋮

600

602 Determine one or more media placement opportunities for a media application at a client device.

604 Generate a request message that includes an indication of each media placement opportunity of the one or more media placement opportunities, wherein the request message has a hierarchical framework with a plurality of levels that includes, for each media placement opportunity:

> 606 (i) a media application context level identifying whether the media placement opportunity is within an in-stream context of the media application or an on-surface context of the media application.

> 608 (ii) a subcontext level identifying a content type of a plurality of possible content types for the respective context identified by the context level.
>
> > 610 The subcontext level identifying a content type of a plurality of possible content types for the respective context identified by the context level includes identifying (i) for the in-stream context, a type of audio and/or video content and (ii) for the on-surface context, a surface type from a plurality of surfaces.

> 612 (iii) one or more description levels for additional information associated with the media placement opportunity.
>
> > 614 The one or more description levels for additional information associated with the media placement opportunity include one or more of:
> > information about a current state of the client device;
> > information about a playback history of a user that is associated with the media application of the electronic device; and
> > information about playback of media content items at the electronic device.
>
> > 616 The one or more description levels include at least two levels, each level specifying different information about the media placement opportunity.

> 618 The hierarchical framework with the plurality of levels of the request message is an extensible framework.

FIG. 6A

620 The request message indicates a first media placement opportunity of the one or more media placement opportunities and a second media placement opportunity of the one or more media placement opportunities.

622 The request message indicates the respective media application context level for each respective media placement opportunity, including indicating:
    an in-stream context of the media application for the first media placement opportunity of the one or more media placement opportunities; and
    an on-surface context of the media application for the second media placement opportunity of the one or more media placement opportunities.

624 Generating the request message that includes an indication of each media placement opportunity of the one or more media placement opportunities is performed while providing a first media content item, wherein the at least one media content item is provided while playback of the first media content item is paused or immediately after the first media content item.

626 Transmit the request message to a server system.

628 Receive, from the server system, a response to the request message that includes one or more media content items selected based on the information included in the hierarchical framework of the request message.

630 Provide, to the media application at the client device, at least one of the one or more media content items within at least one of the media placement opportunities.

632 Providing the at least one of the one or more media content items within at least one of the media placement opportunities includes inserting an advertisement within an audio content item or between audio content items for the in-stream context, and/or inserting an advertisement on a particular user interface for the on-surface context.

634 After receiving, from the server system, the response to the request message that includes one or more media content items selected based on the information included in the hierarchical framework of the request message, select, at the electronic device, a subset, less than all, of one or more media content items within at least one of the media placement opportunities to be provided by the media application.

<u>702</u> Receive, from an electronic device, a request message that includes an indication of each media placement opportunity of one or more media placement opportunities for a media application at a client device, wherein the request message has a hierarchical framework with a plurality of levels that includes, for each media placement opportunity.

<u>704</u> (i) a media application context level identifying whether the media placement opportunity is within an in-stream context of the media application or an on-surface context of the media application.

<u>706</u> (ii) a subcontext level identifying a content type of a plurality of possible content types for the respective context identified by the context level.

<u>708</u> (iii) one or more description levels for additional information associated with the media placement opportunity.

<u>710</u> The electronic device comprises a server in the server system.

<u>712</u> For each media placement opportunity indicated in the request message, identify one or more media content items based on the information included in the hierarchical framework of the request message for the media placement opportunity.

<u>714</u> Identifying the one or more media content items based on the information included in the hierarchical framework of the request message for the media placement opportunity includes determining a type of media content based on the information included in the hierarchical framework.

<u>716</u> Retrieve the at least one media content item from a third-party server.

FIG. 7A

718 A respective media placement opportunity corresponds to a first type of media placement opportunity; and identifying the one or more media content items based on the information included in the hierarchical framework of the request message for the respective media placement opportunity includes identifying respective media content items of a first type corresponding to the first type of media placement opportunity.

720 The respective media placement opportunity corresponds to a first type of media placement opportunity is identified by the subcontext level of the request message.

722 Identifying the one or more media content items based on the information included in the hierarchical framework of the request message for the respective media placement opportunity further includes identifying respective media content items of a second type, distinct from the first type, that correspond to the first type of media placement opportunity.

724 Transmit a response to the request message that includes, for at least one media placement opportunity of the one or more media placement opportunities indicated in the request message, at least one media content item of the one or more media content items identified for the respective media placement opportunity.

726 Transmitting the response to the request message includes transmitting two or more media content items of the one or more media content items. The electronic device selects a subset, less than all, of the two or more media content items to provide within the respective media placement opportunity.

728 The at least one media content item of the one or more media content items identified for the respective media placement opportunity is provided at the electronic device while the electronic device is providing another media content item, while playback of the other media content item is paused or immediately after the other media content item.

730 Receive an indication that two or more media placement opportunities are available at a client device associated with a user; and in response to receiving the indication that two or more respective media placement opportunities are available, provide the at least one media content item of the one or more media content items identified for each of the two or more respective media placement opportunities to the client device.

FIG. 7B

SYSTEMS AND METHODS FOR GENERATING HIERARCHICAL REQUEST MESSAGES FOR MEDIA PLACEMENT OPPORTUNITIES

TECHNICAL FIELD

The disclosed embodiments relate generally to media provider systems, and, in particular, to generating a hierarchical request message identifying one or more media placement opportunities and for providing media content items (e.g., advertisements) within the one or more media placement opportunities.

BACKGROUND

Access to electronic media, such as music, videos, podcast, and audiobook content, has expanded dramatically over time. As a departure from physical media, media content providers stream media to electronic devices across wireless networks, improving the convenience with which users can digest and experience such content.

Generally, a listening session will include media content items (e.g., audio content items) as well as additional media content clips. For example, the additional media content clips may be sponsored content. The additional media content clips are conventionally scheduled to be provided at preset times (e.g., media content breaks) and interrupt the listening session. Additionally, a user is enabled to view and navigate between user interfaces provided by media content providers, optionally during a listening session, which provides opportunities to display additional content, including sponsored content, using the user interfaces.

SUMMARY

It is therefore a general object of embodiments disclosed herein to provide a more dynamic provision of the media content that is specifically selected to be inserted based on a current state of a client device. As users consume content in both streaming contexts (e.g., audio and/or video content) and surface contexts (e.g., displayed via user interfaces), it would be advantageous to request and identify content that matches parameters of a media placement opportunity in order to account for the various listening, browsing, and/or viewing states of the client device. Some embodiments described herein provide request messages that are hierarchical, with one level of the hierarchy (e.g., the top level) indicating the placement type (e.g., in-stream or on surface). The request messages described herein are extensible horizontally (e.g., to other placement types) and vertically (e.g., to specify more detailed information), and thus provide a universal and adaptable format for requesting additional content.

A method for requesting a media content item, such as an advertisement, that meets a set of parameters specific to where the media content item will be inserted within a media application is provided. The request for the media item has a hierarchical framework that is generated to include various levels of information regarding where the media item will be inserted. For example, the hierarchical framework includes, for each placement opportunity to insert a media content item, a context level, a sub-context level that corresponds to the media content type within a respective context, and one or more description levels that include additional information related to the respective sub-context. The request with the hierarchical framework is transmitted to a server, such as an advertising server, to identify one or more media content items (e.g., ads, third-party media content, or other content items) that are good candidates based on the information provided in the request. The one or more media content items that are good candidates are sent to the client device, which inserts at least one of the one or more media content items into a placement opportunity for which the media content item was a good candidate (e.g., as determined according to the information in the hierarchical framework).

To that end, in accordance with some embodiments, a method is provided. The method includes determining, one or more media placement opportunities for a media application at a client device. The method further includes generating a request message that includes an indication of each media placement opportunity of the one or more media placement opportunities, wherein the request message has a hierarchical framework with a plurality of levels that includes, for each media placement opportunity: (i) a media application context level identifying whether the media placement opportunity is within an in-stream context of the media application or an on-surface context of the media application, (ii) a sub-context level identifying a content type of a plurality of possible content types for the respective context identified by the context level; and (iii) one or more description levels for additional information associated with the media placement opportunity. The method includes transmitting the request message to a server system and receiving, from the server system, a response to the request message that includes one or more media content items selected based on the information included in the hierarchical framework of the request message. The method further includes providing, to the media application at the client device, at least one of the one or more media content items within at least one of the media placement opportunities.

In some embodiments, a method for identifying content for media placement opportunities is provided. The method includes, at a server system, the server system having one or more processors and memory storing instructions for executing by the one or more processors, receiving, from an electronic device, a request message that includes an indication of each media placement opportunity of one or more media placement opportunities for a media application at a client device. The request message has a hierarchical framework with a plurality of levels that includes, for each media placement opportunity: (i) a media application context level identifying whether the media placement opportunity is within an in-stream context of the media application or an on-surface context of the media application; (ii) a sub-context level identifying a content type of a plurality of possible content types for the respective context identified by the context level; and (iii) one or more description levels for additional information associated with the media placement opportunity. The method includes, for each media placement opportunity indicated in the request message, identifying one or more media content items based on the information included in the hierarchical framework of the request message for the media placement opportunity; and transmitting a response to the request message that includes, for at least one media placement opportunity of the one or more media placement opportunities indicated in the request message, at least one media content item of the one or more media content items identified for the respective media placement opportunity.

In accordance with some embodiments, an electronic device is provided. The electronic device includes one or more processors and memory storing one or more programs.

The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods of generating hierarchical request messages that identify parameters for media placement opportunities.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6B are flow diagrams illustrating a method for generating a request message for one or more media placement opportunities, in accordance with some embodiments.

FIGS. 7A-7B are flow diagrams illustrating a method for identifying content for one or more media placement opportunities, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
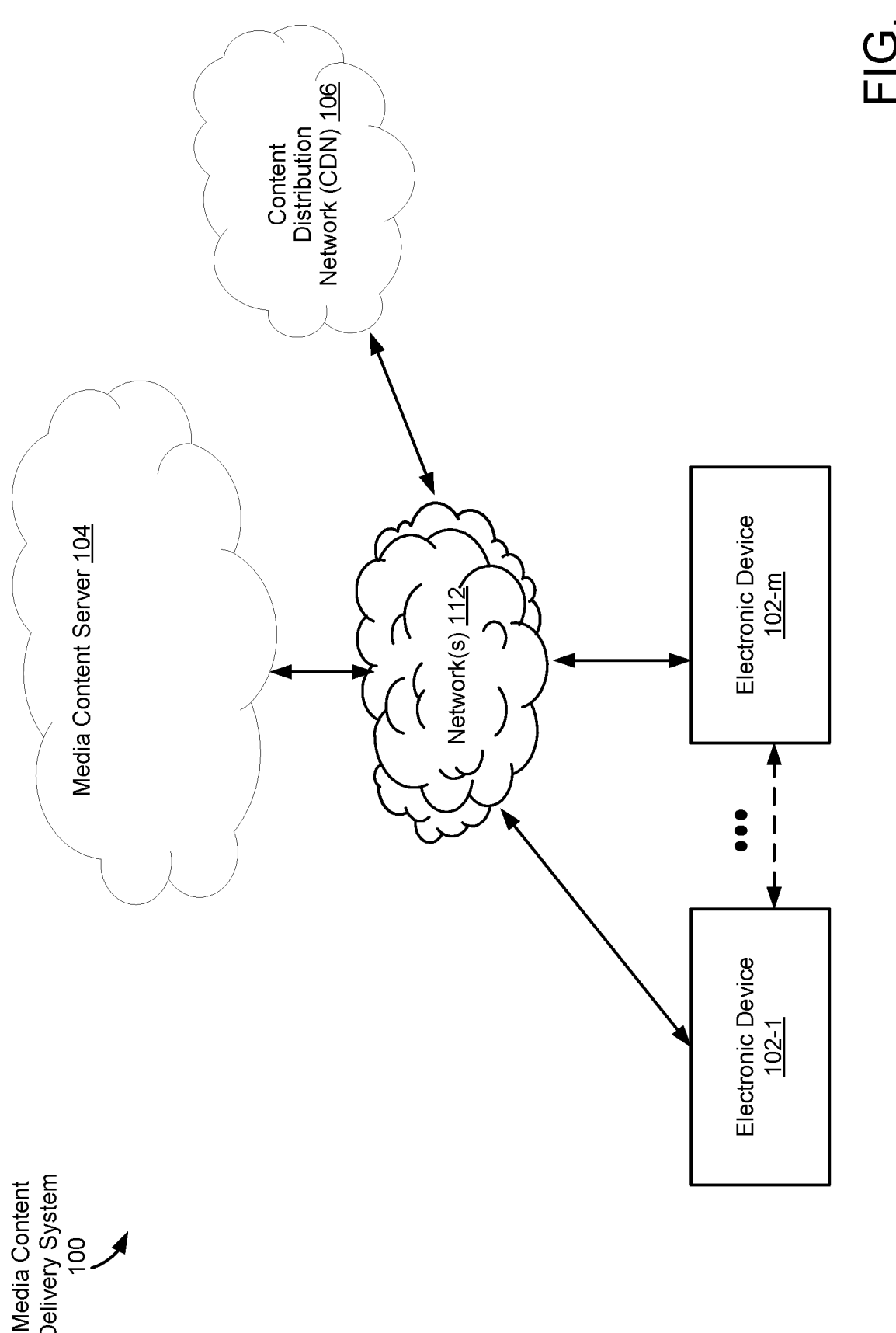
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-*m* send media control requests (e.g., requests to play music, podcasts, movies, videos, or other media items, or playlists thereof) to media content server 104 through network(s) 112. Additionally, electronic devices 102-1 and 102-*m*, in some embodiments, also send indications of media content items to media content server 104 through network(s) 112. In some embodiments, the media content items are uploaded to electronic devices 102-1 and 102-*m* before the electronic devices forward the media content items to media content server 104.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices

102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
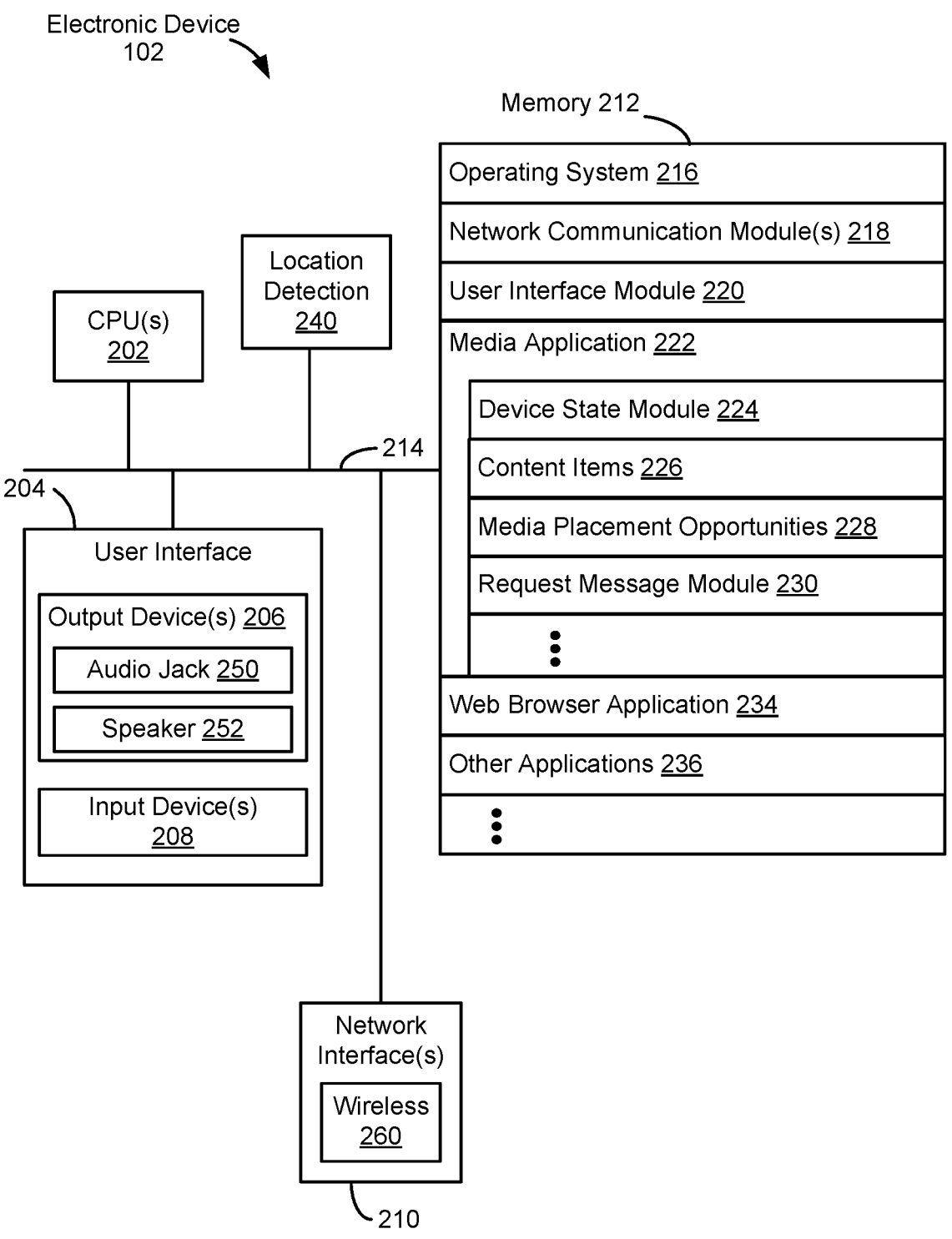
FIG. 2 is a block diagram illustrating an electronic device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes the following modules (or sets of instructions), or a subset or superset thereof:
  - a device state module 224 for providing a current state of electronic device 102, including providing a context, sub-context and/or descriptions of the current state of the electronic device to be used in identifying media placement opportunities at the electronic device 102;
  - content items 226 including one or more requested media content item(s), such as audio and video items, that are streamed to and/or locally stored at electronic device 102 for consumption, and/or one or more media content items identified for placement within a media placement opportunity;
  - media placement opportunities 228 that are stored as possible media placement opportunities that could occur at electronic device 102, and for updating the extensible hierarchical framework to include information for new possible media placement opportunities;
  - request message module 230 for generating one or more hierarchical request messages and/or for receiving responses to request messages, including receiving indications of one or more content items to be inserted within respective media placement opportunities;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
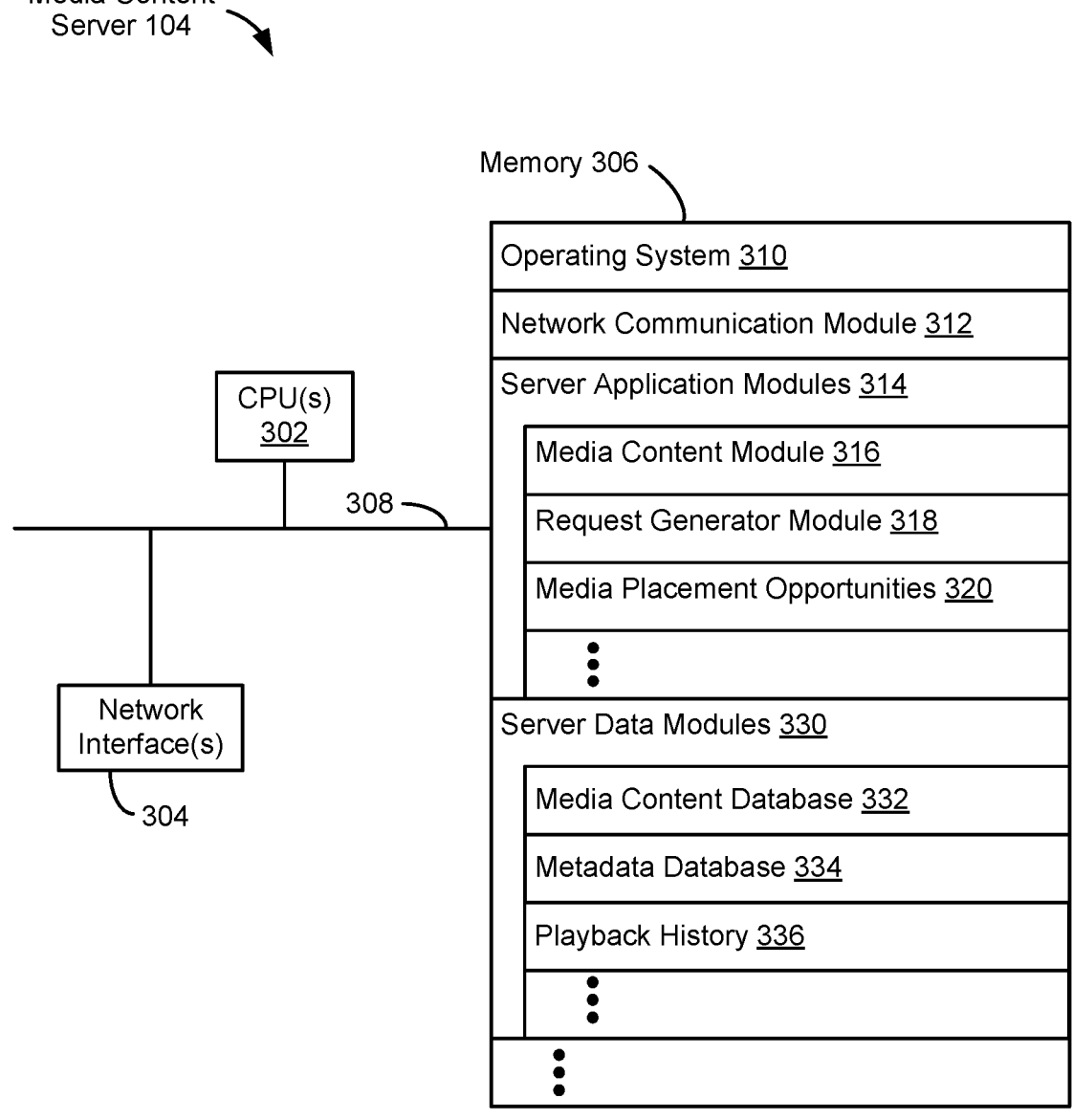
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s) and/or one or more media content items identified for placement within a media placement opportunity;
  - request generator module 318 which generate one or more hierarchical request messages;

media placement opportunities 320 that are stored as possible media placement opportunities that could occur at electronic device 102, and for updating the extensible hierarchical framework to include information for new possible media placement opportunities;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
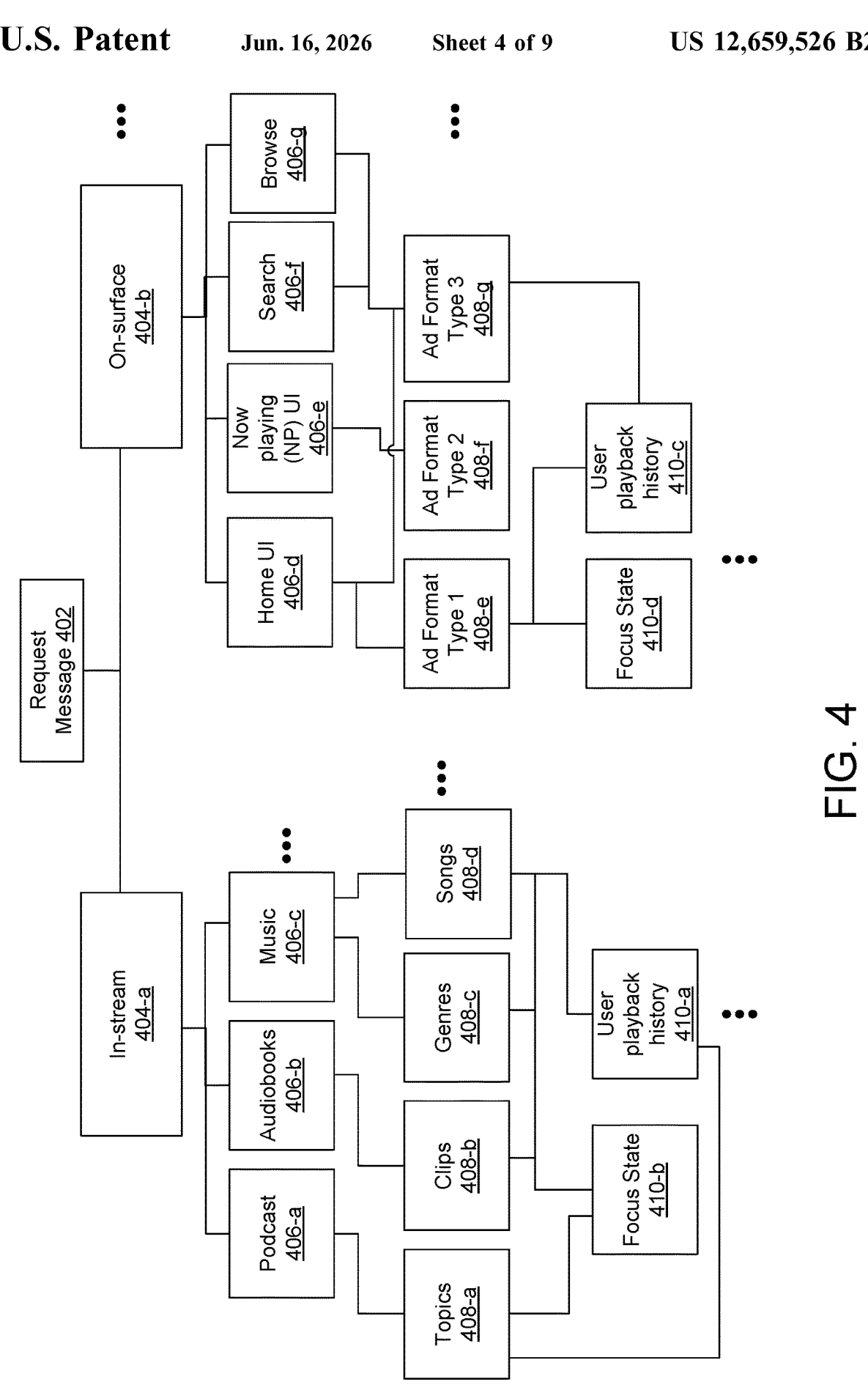
FIG. 4 is a block diagram illustrating the hierarchical framework for a request, in accordance with some embodiments.

FIG. 4 illustrates an example of a hierarchical structure used to generate a request message, in accordance with some embodiments. It will be understood that the levels in the hierarchy described with reference to FIG. 4 are examples of information that is provided within respective levels, and that additional and/or alternative information may be provided at the various levels of the hierarchy. It will also be understood that the hierarchy is extensible, both vertically and horizontally, such that additional levels, information and/or categories may be added to the hierarchy. As used herein, vertically extensible refers to the ability to add additional levels in the hierarchy, whereas horizontally extensible refers to the ability to add additional fields within a respective level of the hierarchy.

In some embodiments, the request message 402 corresponds to a request to place media content (e.g., third-party media content, or other media content (e.g., an advertisement)) within one or more media placement opportunities. In some embodiments, a top level of the request structure includes a list of media placement opportunities that a request generator (e.g., the request generator 502, as described below with reference to FIG. 5) would like to fill. As such, the request message 402 includes information from one or more levels of the hierarchy to define or otherwise provide information about respective media placement opportunities, such that appropriate media content can be identified and/or retrieved for placement within the media placement opportunities defined by the request message 402.

In some embodiments, a request message 402 identifies more than one media placement opportunity. For example, at least two media placement opportunities co-occur (e.g., while a user is listening to content (e.g., an in-stream media placement opportunity) and browsing a user interface of the media application (e.g., an on-surface media placement opportunity)), such that the request message 402 identifies both media placement opportunities and is enabled to provide candidates for media content to be inserted into one or both media placement opportunities (e.g., an audio media item candidate to be inserted while the user is listening to streaming content and/or a visual media item candidate to be inserted on the user interface). In some embodiments, media content is not necessarily provided within each media placement opportunity. For example, the audio media item and the visual media item are optionally not both provided. In some embodiments, one media placement opportunity is utilized without utilizing another media placement opportunity based at least in part on a current state of the user's client device when the media placement opportunities arise.

In some embodiments, the request message 402 is generated at a server system (sometimes also referred to herein as the "media-providing service client" that receives content from one or more third-party servers), or at an electronic device 102-1 (e.g., a client device) associated with a particular user that is consuming media using a media application of the media-providing service. For example, the user is participating in a playback session during which one or more media content items (e.g., playlists, songs, albums, podcasts, audiobooks, videos, or other types of media content) are provided by the media-providing service to the user's client device. In some embodiments, the request message 402 is generated during the playback session. In some embodiments, the request message 402 is generated before a playback session such that additional media content (e.g., advertisement or other sponsored content) is predetermined and/or prefetched for playback during a future playback session of the user. In some embodiments, the request message 402 is generated by request generator 502 (FIG. 5) for a plurality of possible media placement opportunities, such that the media content identified to fill the respective media placement opportunities is ready to be provided when the respective media placement opportunity occurs (e.g., in the future).

In some embodiments, a first level of the hierarchy (e.g., items 404) corresponds to a context of the user and/or the user's device (e.g., a context of the media placement opportunity). In some circumstances, the context of the user and/or the user's device includes information on the state of the media application at the time that the requested media item would be played back. For example, the context is an in-stream context 404-*a* while the user's device is playing back media content. In some embodiments, in-stream context 404-*a* includes playing back audio and/or video content that is streamed to, or otherwise provided and/or played back at, the user's device by the media-providing service. For example, audio content is streamed for an in-stream context 404-*a* whether or not a media application of the media-providing service is backgrounded on the user's device. In some embodiments, the context is an in-stream context 404-*a* while a user interface the media application of the media-providing service is displayed on the user's device (e.g., not backgrounded), such that the media placement opportunity may be inserted in-stream while the media application is active (e.g., displaying one or more user interfaces of the media application).

In some embodiments, the context is defined as on-surface context 404-*b* in accordance with a determination that the media placement opportunity is within a particular surface, for example, a user interface of the media application associated with the media-providing service. For example, the media application of the media-providing service is displayed on the user's device (e.g., not backgrounded) and displays one or more user interfaces of the media application.

In some embodiments, a second level of the hierarchy (e.g., items 406) provides a sub-context, based on (e.g., within) the determined context of the media placement opportunity. For example, for the in-stream context 404-*a*, the sub-context identifies a type of media content that is playing back for the media placement opportunity. For example, the sub-context defines whether the type of media is a podcast 406-*a*, audiobook 406-*b*, music 406-*c*, or other type of media. In a more specific example, an in-stream placement opportunity (404-*a*) for a podcast (406-*a*) is an opportunity to interrupt the audio of a podcast by e.g., temporarily pausing the podcast stream, providing the additional content (e.g., a media content item presenting an advertisement or other sponsored content), and then resuming the podcast stream.

In some embodiments, the sub-context for the on-surface context 404-*b* of the media placement opportunity defines the type of user interface that is provided for the media placement opportunity. For example, the type of user interface includes one or more various user interfaces provided within the application of the media-providing service. For example, the type of user interface corresponds to a home user interface 406-*d*, a now playing user interface 406-*e*, a search user interface 406-*f*, a browse user interface 406-*g*, or another user interface of the application. More specifically, on-surface placement opportunity (404-*b*) for the home UI (406-*d*) is an opportunity to display additional content over a portion of the home UI. The additional content may or may not include audio, and such audio may or may not interrupt currently playing audio. For example, in some embodiments, on-surface additional content includes visual content (e.g., an image or a video) displayed in the UI, as well as audio content that is muted or not started by default. The UI displays an indication that the additional content includes audio (e.g., an animated icon), and the user may unmute or start the audio, thus interrupting currently playing audio.

In some embodiments, a third level (e.g., a description level) of the hierarchy corresponds to one or more descriptors of the media placement opportunity. For example, if the sub-context is music 406-*c*, the descriptor could be a song 408-*d*, genre 408-*c*, album, artist, or other detailed information related to the music 406-*c* that is provided for the media placement opportunity. Similarly, if the sub-context defines the type of media as a podcast 406-*a*, the descriptors could further provide information on a topic 408-*a* of the podcast, a producer of the podcast, or other information related to the particular podcast. Other examples of information provided at the description level(s) of the hierarchy (e.g., under the in-stream context 404-*b*) include information about clips 408-*b* (e.g., excerpts and/or chapters of audiobooks 406-*b*).

In some embodiments, additional levels of the hierarchy provide additional information about the media placement opportunity. For example, additional description levels are provided in the hierarchy at an equal level, or a lower level, than the items 408. For example, a lower description level (e.g., items 410) includes information relating to a state of the device (e.g., focus state 410-*b* and/or focus state 410-*d*) and/or information about a user playback history 410-*a* and/or 410-*c*. For example, information about the focus state of the device is used to determine whether to provide content, in the media placement opportunity, that includes video and/or audio format, or to provide content that includes audio (e.g., without video), for example, within a stream (e.g., between audio tracks or other audio content that are provided).

In some embodiments, the third level of hierarchy under the on-surface context 404-*b* includes different descriptors than the descriptors of the third level of the hierarchy under the in-stream context 404-*a*. For example, under the sub-context level that specifies a type of user interface (e.g., a home user interface 406-*d*, a now playing user interface 406-*e*, a search user interface 406-*f*, a browse user interface 406-*g*, or another user interface of the application), additional information about the user interface, such as the format (e.g., type) of advertisement or other content that may be placed and/or inserted within the respective user interface, is provided at the third level of the hierarchy. For example, the home user interface 406-*d* may include one or more of a first ad format type 1 408-*e* ad format type 2 408-*f* and/or ad format type 3 408-*g*. In some embodiments, each ad format type corresponds to a different types of advertisement format (e.g., user interface elements, audio content and/or video content) that may be provided on respective user interfaces. In some embodiments, the ad format type 3 408-*g* includes audio and/or video content that continues to be provided while navigating within and/or away from the user interface (e.g., an advertisement with an audio format continues to playback while navigating from the home UI 406-*d* to search user interface 406-*f*). In some embodiments, ad format type 1 408-*e* includes a user interface popup or other user interface element that at least partially overlays the respective user interface.

As illustrated in FIG. 4, in some embodiments, a single sub-context is connected to one or more descriptors in the third level of the hierarchy. For example, a plurality of descriptors are enabled to describe a respective context and/or sub-context. In some embodiments, each descriptor in the third level of the hierarchy that relates to a particular sub-context is included in the request message in order to further define and/or differentiate media placement opportunities. For example, a first media placement opportunity is described (e.g., for placement within a respective context, such as for Home UI 406-*d*, now playing UI 406-*e*, search user interface 406-*f* or browse user interface 406-*g*) by both having ad format type 1 408-*e* and ad format type 2 408-*g*, while another media placement opportunity is only described as having ad format type 1 408-*e*.

FIG. 4 further illustrates that one or more descriptors in the third level (e.g., or lower level(s)) of the hierarchy are related to more than one sub-context and/or context in the hierarchy. As such, the one or more descriptors that overlap between sub-contexts and/or contexts further describe various other media placement opportunities to be identified by request message 402.

In some embodiments, request message 402 includes information that reflects the hierarchical framework. For example, the request message 402 indicates a respective media placement opportunity by including information along a path down the hierarchy. As such, a request message 402 that includes information about a single media placement opportunity, includes an indication of, e.g., in-stream context 404-*a*, music 406-*c*, songs 408-*d*, and user playback history 410-*a*. The media placement opportunity is thus defined for an occurrence when the user's device is streaming music (e.g., in-stream context 404-*a*), and while the music includes a particular song or set of songs 408-*d*, and is further based on the playback history 410-*a* of the user (e.g., a number of times the user has consumed the song(s) identified in songs 408-*d*). Accordingly, media placement opportunities are defined according to the hierarchical structure such that content is selected and identified for the particular media placement opportunity. In this way, the system identifies, and provides, tailored content for the media placement opportunity when it arises.

Figure 5:
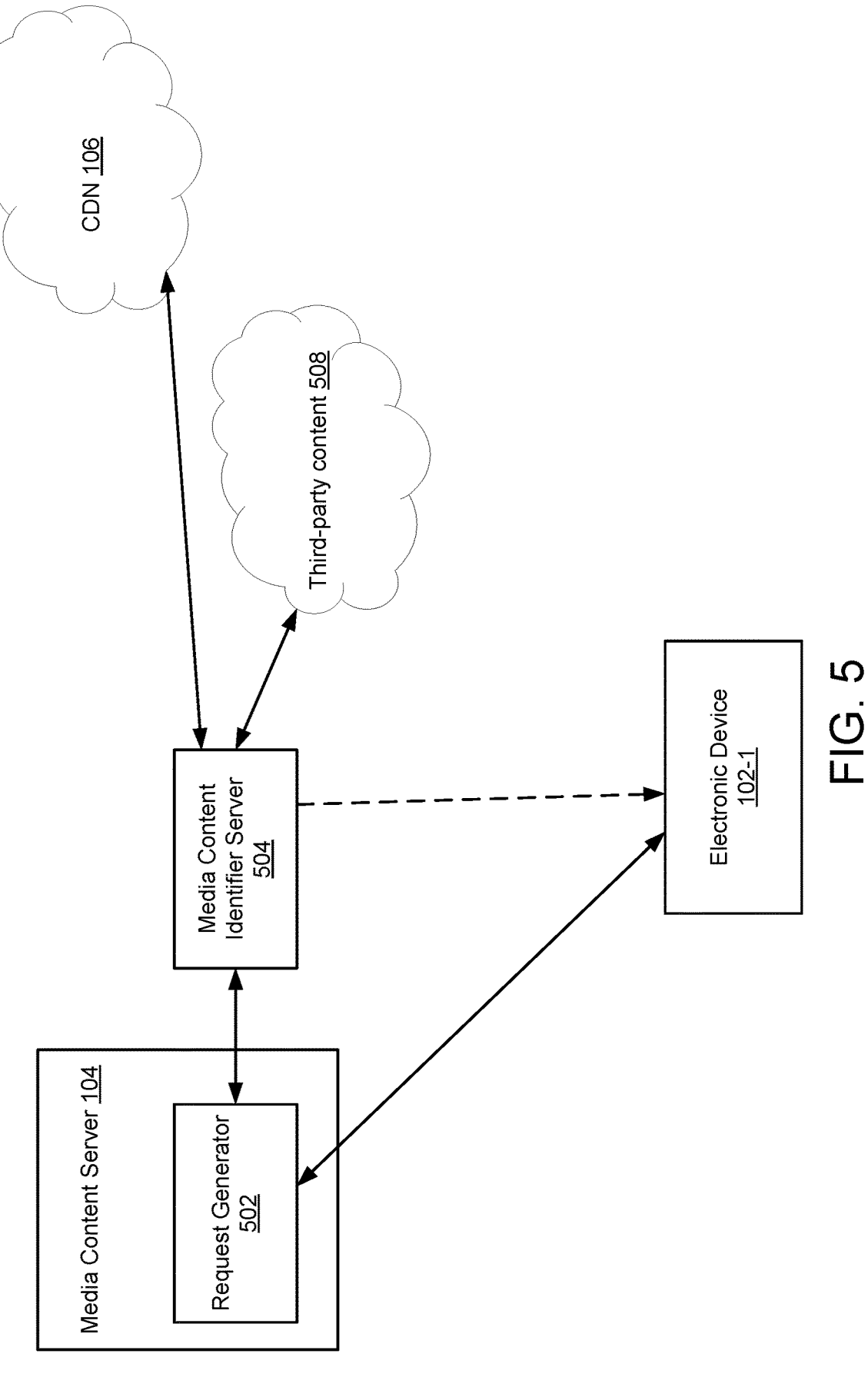
FIG. 5 is a block diagram illustrating a method of generating a request for media content, in accordance with some embodiments.

FIG. 5 illustrates a system diagram for generating request messages (e.g., request message 402) for one or more media placement opportunities at electronic device 102-1. In some embodiments, electronic device 102-1 is participating in a current playback session, and sends information about a current state of electronic device 102-1.

In some embodiments, the current state of the playback session of electronic device 102-1 is provided to media content server 104. For example, electronic device 102-1 is a client device associated with a user, that is executing a media application of the media-providing service associated with media content server 104.

In some embodiments, request generator 502 generates one or more request messages, each request message including information for one or more media placement opportunities. In some embodiments, the information for the one or more media placement opportunities is provided using the hierarchical request message described with reference to FIG. 4.

In some embodiments, request generator 502 is hosted by a server system of the media-providing service (e.g., media content server 104). In some embodiments, request generator 502 passes the request message to a media content identifier server 504, via an application programming interface (API). The API is configured to interpret request messages having the hierarchical structure described herein. In some embodiments, media content identifier server 504 is hosted at a server distinct from the server hosting request generator 502 (e.g., media content identifier server 504 and request generator 502 are optionally hosted on different servers within a same server system of the media-providing service). In some embodiments, media content identifier server 504 is hosted by a distinct server system (e.g., associated with a third-party distinct from the media content provider hosting media content server 104). For example, request generator 502 corresponds to an intermediary requestor that sits on top of media content server 104. In some embodiments, media content identifier server 504 communicates with one or more content servers, such as CDN 106 (e.g., for content provided and/or hosted by the media-providing service) and/or third-party content servers 508 (e.g., for retrieving third-party content hosted by a third-party distinct from the media-providing service), to retrieve candidates of one or more media content items that satisfy, or otherwise match, the criteria specified by the request message from request generator 502. In some embodiments, the media content identifier compiles the candidates from CDN 106 and/or third-party content servers 508 and provides at least a subset of the candidates to electronic device 102-1.

In some embodiments, the candidates of one or more media content items comprise advertisements to be provided to electronic device 102-1. In some embodiments, the candidates of one or more media content items include audio content, video content and/or user interface content. For example, one or more media placement opportunities that occur (e.g., and/or co-occur) include a media placement opportunity for audio content, a media placement opportunity for video content and/or a media placement opportunity for user interface content (e.g., user interface objects to be displayed in a user interface). As such, the hierarchical request message described with reference to FIG. 4 identifies, for a media placement opportunity, a context, sub-context, and other descriptors, so that candidates that match the request message are identified and retrieved from third-party content servers 508 and/or CDN 106.

In some embodiments, request generator 502 generates requests for a plurality of media placement opportunities and receives, from media content identifier server 504, media content selected to apply to respective media placement opportunities. In some embodiments, request generator 502 obtains the media content before the media placement opportunity is present at electronic device 102-1. For example, request generator 502 operates in advance of the media placement opportunities at electronic device 102-1 such that, when a respective media placement opportunity does arise, request generator 502 has already received the identified content to place within the media placement opportunity (e.g., which matches a media placement opportunity outlined by a request message 402 generated by request generator 502). Thus, media content server 104 is enabled to prefetch content to be placed in a variety of media placement opportunities, such that, upon determining that electronic device 102-1 has a respective media placement opportunity, media content server 104 is enabled to quickly provide content items within the media placement opportunity.

In some embodiments, request generator 502 generates the request message 402 in real-time (e.g., in response to determining a media placement opportunity is available at electronic device 102-1), for example, during a current playback session of electronic device 102-1.

In some embodiments, electronic device 102-1 optionally receives the at least the subset of candidates and plays back one or more of the candidates within the media placement opportunity defined by the request generator 502. Thus, the media content server 104 identifies relevant media content that takes into account the current state of electronic device 102-1 (e.g., that identifies particular media placement opportunities that are available, or will be available, at electronic device 102-1 during a playback session), and provides the media content to the electronic device 102-1 to be inserted or otherwise provided at the electronic device 102-1. In some embodiments, the media content identified to fill the media placement opportunity interrupts currently played back and/or displayed content at electronic device 102-1.

In some embodiments, the electronic device 102-1 selects (e.g., makes the final decision) which media content item(s) to provide within a respective media placement opportunity.

In some embodiments, the electronic device 102-1 receives instructions (e.g., from media content server 104) that determines which media content item(s) to provide within a respective media placement opportunity.

FIGS. 6A-6B are flow diagrams illustrating a method 600 of generating a request message with a hierarchical structure, in accordance with some embodiments. Method 600 may be performed at a computer system (e.g., media content server 104 and/or electronic device(s) 102) having one or more processors and memory storing instructions for execution by the one or more processors. In some embodiments, the method 600 is performed by executing instructions stored in the memory (e.g., memory 212, FIG. 2, memory 306, FIG. 3) of the computer system. In some embodiments, the method 600 is performed by a combination of the server system (e.g., including media content server 104 and/or media content identifier server 504) and a client device (e.g., electronic device 102-1).

Referring now to FIG. 6A, in performing the method 600, the computer system determines (602) one or more media placement opportunities for a media application at a client device. For example, request generator 502 determines one or more media placement opportunities that could be available within the media application executing at electronic device 102-1 associated with a user.

The computer system (e.g., request generator 502) generates (604) a request message that includes an indication of each media placement opportunity of the one or more media placement opportunities. In some embodiments, the request message includes indications for two or more media placement opportunities.

The request message has a hierarchical framework with a plurality of levels that includes, for each media placement opportunity: (i) a media application context level (606) identifying whether the media placement opportunity is within an in-stream context (e.g., a first context) of the media application or an on-surface context (e.g., a second context) of the media application. In some embodiments, the media application context level is determined based on a state of the media application. For example, a media placement opportunity is to be presented while the media application is in a respective state, and the media application context level in the hierarchical framework of the request indicates to which respective state of the media application the media placement opportunity belongs. For example, a media placement opportunity to be played in-stream, such as between media content items that are presented (e.g., streamed and/or played back, e.g., as a temporal (e.g., sequential) part of a listening session), is different from a media placement opportunity to be played on-surface, such as displayed on a user interface of the media application, such as a home user interface and/or a now playing view.

The hierarchical framework with a plurality of levels includes (ii) a sub-context level (608) identifying a content type of a plurality of possible content types for the respective context identified by the context level.

In some embodiments, the sub-context level identifying a content type of a plurality of possible content types for the respective context identified by the context level includes (610) identifying (i) for the in-stream context, a type of audio and/or video content (e.g., music, podcast, or audiobook) for the media placement opportunity. In some embodiments, the media placement opportunity for a podcast (e.g., that includes audio and/or video content) is different from the media placement opportunity for a music track (e.g., that includes audio and/or video content) and (ii) for the on-surface context, a surface type (e.g., a user interface and/or view, such as home user interface, now playing view, etc.) from a plurality of surfaces, as described with reference to FIG. 4.

In some embodiments, the hierarchical framework with a plurality of levels includes (iii) one or more description levels (612) for additional information (e.g., device information, whether the user is in-focus vs. out of focus with respect to the electronic device 102-1, music track and/or podcast episode information, etc.) associated with the media placement opportunity. For example, as described with reference to FIG. 4, the request message 402 includes a context level, a sub-context level, and at least one description level for each media placement opportunity identified in the request message 402.

In some embodiments, the one or more description levels for additional information associated with the media placement opportunity include (614) one or more of: information about a current state of the client device (e.g., a current location of the client device, a focus state of the client device, a type of client device, a network the client device is connected to, a playback device the client device is connected to, etc.), information about a playback history of a user that is associated with the media application of the electronic device (and/or other profile information of the user), and information about playback of media content items at the electronic device (e.g., a current played back media content item, a media content item to be played back next, playlist information about the currently played back media application).

In some embodiments, the one or more description levels include (616) at least two levels, each level specifying different information about the media placement opportunity.

In some embodiments, the hierarchical framework with the plurality of levels of the request message is (618) an extensible framework (e.g., extensible horizontally, e.g., such that new media application context, sub-contexts, or descriptors, may be added, and/or vertically, e.g., such that additional levels in the hierarchy may be added), as described with reference to FIG. 4.

In some embodiments, the request message indicates (620) a first media placement opportunity of the one or more media placement opportunities and a second media placement opportunity of the one or more media placement opportunities. In some embodiments, the media placement opportunities are alternatives and/or overlap in a time to be presented (e.g., the client device is enabled to present a media content item for the first media placement opportunity or the second media placement opportunity). In some embodiments, media content is provided in at least two of the media placement opportunities that are included in the same request. In some embodiments, the media placement opportunities included in a same request are related (e.g., determined for an overlapping time period).

In some embodiments, the request message indicates (622) the respective media application context level for each respective media placement opportunity, including indicating: an in-stream context of the media application for the first media placement opportunity of the one or more media placement opportunities; and an on-surface context of the media application for the second media placement opportunity of the one or more media placement opportunities. In some embodiments, having two or more potential media placement opportunities in the same request enables the electronic device (e.g., request generator 502, content server 104 and/or electronic device 102-1) to select from the potential media placement opportunities, where to insert the one or more media content items that are selected by the server system. For example, a user may view different surface(s) of the media application (e.g., providing an on-surface opportunity) while simultaneously listening to content (e.g., providing an in-stream opportunity).

In some embodiments, generating the request message that includes an indication of each media placement opportunity of the one or more media placement opportunities is performed (624) while providing a first media content item (e.g., in real-time), wherein the at least one media content item is provided while playback of the first media content item is paused or immediately after (e.g., or within) the first media content item. For example, the at least one of the one or more media content items provided within at least one of the media placement opportunities is provided between the first media content item and a next media content item in a playback queue. In some embodiments, the one or more media placement opportunities arise at a later time (e.g., not in real time with the generation of the request), and the electronic device stores the one or more media content items to be provided at the later time when the one or more media placement opportunities occur (e.g., the electronic device stores the candidates to select later).

The computer system transmits (626) the request message to a server system (e.g., request generator 502 transmits the request message 402 to media content identifier server 504, which is optionally hosted at a server distinct from the server hosting request generator 502).

The computer system receives (628), from the server system, a response to the request message that includes one or more media content items selected based on the information included in the hierarchical framework of the request message. For example, request generator 502 (e.g., and/or electronic device 102-1) receives the identified media content items for the one or more media placement opportunities indicated in the request message 402.

The computer system provides (630) to the media application at the client device (e.g., electronic device 102-1), at least one of the one or more media content items within at least one of the media placement opportunities.

In some embodiments, providing (632) the at least one of the one or more media content items within at least one of the media placement opportunities includes inserting an advertisement within an audio content item (e.g., and/or within a video content item) or between audio content items (e.g., and/or between video content items, or between a combination of an audio content item and a video content item) for the in-stream context (e.g., for the first context, the advertisement is presented during playback of a media content item in the media application), and/or inserting an advertisement on a particular user interface for the on-surface context (e.g., for the second context, the advertisement is presented in a user interface provided by the media application).

In some embodiments, after receiving, from the server system, the response to the request message that includes one or more media content items selected based on the information included in the hierarchical framework of the request message, the computer system (e.g., request generator 502 and/or electronic device 102-1) selects (634) a subset, less than all, of one or more media content items within at least one of the media placement opportunities to be provided by the media application. For example, the server system provides the one or more media content items as candidates. In some embodiments, the server system provides a first set of the one or more media content items as candidates for the first media placement opportunity and a second set of the one or more media content items as candidates for the second media placement opportunity; and the electronic device selects whether to provide a respective media content in the first media placement and/or the second media placement opportunity from the respective set of one or more media content items provided as candidates. As such, the electronic device determines (i) which media placement opportunities to provide media content and/or (ii) which media content item(s) to provide within the media placement opportunities).

Although FIGS. 6A-6B illustrate a number of logical stages in a particular order, stages which are not order dependent may be reordered and other stages may be combined or broken out. Some reordering or other group-ings not specifically mentioned will be apparent to those of ordinary skill in the art, so the ordering and groupings presented herein are not exhaustive. Moreover, it should be recognized that the stages could be implemented in hard-ware, firmware, software, or any combination thereof.

FIGS. 7A-7B are flow diagrams illustrating a method 700 of transmitting a response to a request message with a hierarchical structure, in accordance with some embodi-ments. Method 700 may be performed at a server system (e.g., media content server 104 and/or media content iden-tifier server 504) having one or more processors and memory storing instructions for execution by the one or more processors. In some embodiments, the method 700 is performed by executing instructions stored in the memory (e.g., memory 306, FIG. 3) of the server system. In some embodiments, the method 700 is performed by a combina-tion of the server system (e.g., including media content server 104 and CDN 106) and a computer system (e.g., electronic device 102 or another server).

For example, method 700 is performed at a server system that includes media content identifier server 504, as illus-trated in FIG. 5.

The server system receives (702), from an electronic device (e.g., another server in the server system, request generator 502, FIG. 5 and/or from electronic device 102-1), a request message that includes an indication of each media placement opportunity of one or more media placement opportunities for a media application at a client device. In some embodiments, the request message includes indica-tions for two or more media placement opportunities, wherein the request message has a hierarchical framework with a plurality of levels that includes, for each media placement opportunity: (i) a media application context level (704) identifying whether the media placement opportunity is within an in-stream context (e.g., a first context) of the media application or an on-surface context (e.g., a second context) of the media application. For example, the media application context level is determined based on a state of the media application. For example, a media placement opportunity is to be presented while the media application is in a respective state, and the media application context level in the hierarchical framework of the request indicates to which respective state of the media application the media placement opportunity belongs. For example, a media place-ment opportunity to be played in-stream, such as between media content items that are presented (e.g., streamed and/or played back, e.g., as a temporal (e.g., sequential) part of a listening session), is different from a media placement opportunity to be played on-surface, such as displayed on a user interface of the media application, such as a home user interface and/or a now playing view.

The hierarchical framework with the plurality of levels includes (ii) a sub-context level (706) identifying a content type of a plurality of possible content types for the respective context identified by the context level, as described with reference to FIG. 4.

The hierarchical framework with the plurality of levels includes (iii) one or more description levels (708) for additional information (e.g., device information, whether the user is in-focus vs. out of focus with respect to the electronic device 102-1, music track and/or podcast episode information, etc.) associated with the media placement opportunity, as described with reference to FIG. 4.

In some embodiments, the electronic device comprises (710) a server in the server system. For example, the electronic device is request generator 502 hosted within the server system (e.g., media content server 104 and media content identifier server 504 are optionally within the same server system).

In some embodiments, the electronic device comprises the client device (e.g., electronic device 102-1).

For each media placement opportunity indicated in the request message, the server system identifies (712) one or more media content items based on the information included in the hierarchical framework of the request message for the media placement opportunity.

In some embodiments, identifying the one or more media content items based on the information included in the hierarchical framework of the request message for the media placement opportunity includes (714) determining a type of media content based on the information included in the hierarchical framework.

In some embodiments, the server system retrieves (716) the at least one media content item from a third-party server (e.g., inventory provided by a third-party that is distinct from the media content provider).

In some embodiments, a respective media placement opportunity corresponds to (718) a first type of media placement opportunity; and identifying the one or more media content items based on the information included in the hierarchical framework of the request message for the respective media placement opportunity includes identifying respective media content items of a first type corresponding to the first type of media placement opportunity. For example, the server system is enabled to place different media content types across different media placement opportunities.

In some embodiments, the respective media placement opportunity corresponds to (720) a first type of media placement opportunity is identified by the sub-context level of the request message.

In some embodiments, identifying the one or more media content items based on the information included in the hierarchical framework of the request message for the respective media placement opportunity further includes (722) identifying respective media content items of a second type, distinct from the first type, that correspond to the first type of media placement opportunity. For example, multiple types of content are enabled to be placed within a same media placement opportunity.

The server system transmits (724) (e.g., to the client device (e.g., electronic device 102-1) and/or to the electronic device in communication with the server system (e.g., the electronic device is optionally a server (e.g., media content server 104) of the server system)), a response to the request message that includes, for at least one media placement opportunity of the one or more media placement opportunities indicated in the request message, at least one media content item of the one or more media content items identified for the respective media placement opportunity.

In some embodiments, transmitting the response to the request message includes (726) transmitting two or more media content items of the one or more media content items; and the electronic device selects a subset, less than all, of the two or more media content items to provide within the respective media placement opportunity. In some embodiments, the electronic device that sends the request message is the same electronic device that selects a subset of the two or more media content items to be provided. In some embodiments, a client device, distinct from the electronic device, selects a subset of the two or more media content items to be provided. For example, the server system (e.g., media content identifier server 504 and/or media content server 104) provides the at least two or more media content items to provide and the client device makes the final decision as to which content item(s) to provide.

In some embodiments, the at least one media content item of the one or more media content items identified for the respective media placement opportunity is provided (728) at the electronic device while the electronic device is providing another media content item, while playback of the other media content item is paused or immediately after (e.g., or within) the other media content item. For example, while the electronic device 102-1 is presenting a user interface, media content identified for an on-surface media placement opportunity is used to replace display of the user interface. In some embodiments, while the electronic device 102-1 is presenting media content, such as audio content, an in-stream media placement opportunity is filled by replacing the media content that is presented with the media content identified for the media placement opportunity.

In some embodiments, the server system receives (730) an indication that two or more media placement opportunities are available at a client device associated with a user; and in response to receiving the indication that two or more respective media placement opportunities are available, provides the at least one media content item of the one or more media content items identified for each of the two or more respective media placement opportunities to the client device. For example, if both an in-stream media placement opportunity and an on-surface media placement opportunity cooccur, in some embodiments, the server system provides media content for each media placement opportunity. In some embodiments, the electronic device 102-1 provides one or more of the received media content items identified for the media placement opportunities, without necessarily providing media content for each of the media placement opportunities. As such, a real-time determination as to which media placement opportunities to fill can be made, with content identified for each possible media placement opportunity, without requiring electronic device 102-1 to present content within every available media placement opportunity.

Although FIGS. 7A-7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method comprising:

determining one or more media placement opportunities for a media application at a client device;

generating a request message that includes an indication of each media placement opportunity of the one or more media placement opportunities, wherein the request message has a hierarchical framework with a plurality of levels that includes, for each media placement opportunity:

(i) a media application context level identifying whether the media placement opportunity is within an in-stream context of the media application or an on-surface context of the media application; and (ii) a sub-context level identifying a content type of a plurality of possible content types for the respective context identified by the media application context level, wherein the plurality of possible content types for the in-stream context in the hierarchical framework is different from the plurality of possible content types for the on-surface context in the hierarchical framework;

transmitting the request message to a server system;

receiving, from the server system, a response to the request message that includes one or more media content items selected based on information included in the hierarchical framework of the request message; and providing, to the media application at the client device, at least one of the one or more media content items within at least one of the media placement opportunities.

2. The method of claim 1, wherein the sub-context level identifying a content type of a plurality of possible content types for the respective context identified by the media application context level includes identifying (i) for the in-stream context, a type of audio and/or video content and (ii) for the on-surface context, a surface type from a plurality of surfaces.

3. The method of claim 1, wherein providing the at least one of the one or more media content items within at least one of the media placement opportunities includes inserting an advertisement within an audio content item or between audio content items for the in-stream context, and/or inserting an advertisement on a particular user interface for the on-surface context.

4. The method of claim 1, wherein the hierarchical framework with the plurality of levels of the request message is an extensible framework.

5. The method of claim 1, wherein the request message indicates a first media placement opportunity of the one or more media placement opportunities and a second media placement opportunity of the one or more media placement opportunities.

6. The method of claim 5, wherein the request message indicates the respective media application context level for each respective media placement opportunity, including indicating:

an in-stream context of the media application for the first media placement opportunity of the one or more media placement opportunities; and an on-surface context of the media application for the second media placement opportunity of the one or more media placement opportunities.

7. The method of claim 1, wherein the plurality of levels of the request message having the hierarchical framework further includes, for each media placement opportunity, (iii) one or more description levels for additional information associated with the media placement opportunity.

8. The method of claim 7, wherein the one or more description levels for additional information associated with the media placement opportunity include one or more of:

information about a current state of the client device;

information about a playback history of a user that is associated with the media application of the client device; and information about playback of media content items at the client device.

9. The method of claim 7, wherein the one or more description levels include at least two levels, each level specifying different information about the media placement opportunity.

10. The method of claim 1, further including, after receiving, from the server system, the response to the request message that includes one or more media content items selected based on the information included in the hierarchical framework of the request message, selecting, at the client device, a subset, less than all, of one or more media content items within at least one of the media placement opportunities to be provided by the media application.

11. The method of claim 1, wherein generating the request message that includes an indication of each media placement opportunity of the one or more media placement opportunities is performed while providing a first media content item, wherein the at least one media content item is provided while playback of the first media content item is paused or immediately after the first media content item.

12. A computer system comprising:

one or more processors; and memory storing one or more programs, the one or more programs including instructions for:

determining one or more media placement opportunities for a media application at a client device;

generating a request message that includes an indication of each media placement opportunity of the one or more media placement opportunities, wherein the request message has a hierarchical framework with a plurality of levels that includes, for each media placement opportunity:

(i) a media application context level identifying whether the media placement opportunity is within an in-stream context of the media application or an on-surface context of the media application;

(ii) a sub-context level identifying a content type of a plurality of possible content types for the respective context identified by the media application context level, wherein the plurality of possible content types for the in-stream context in the hierarchical framework is different from the plurality of possible content types for the on-surface context in the hierarchical framework;

transmitting the request message to a server system;

receiving, from the server system, a response to the request message that includes one or more media content items selected based on information included in the hierarchical framework of the request message; and providing, to the media application at the client device, at least one of the one or more media content items within at least one of the media placement opportunities.

13. A non-transitory computer-readable storage medium storing one or more programs for execution by a computer system with one or more processors, the one or more programs comprising instructions for:

determining one or more media placement opportunities for a media application at a client device;

generating a request message that includes an indication of each media placement opportunity of the one or more media placement opportunities, wherein the request message has a hierarchical framework with a plurality of levels that includes, for each media placement opportunity:

(i) a media application context level identifying whether the media placement opportunity is within an in-stream context of the media application or an on-surface context of the media application;

(ii) a sub-context level identifying a content type of a plurality of possible content types for the respective context identified by the media application context level, wherein the plurality of possible content types for the in-stream context in the hierarchical framework is different from the plurality of possible content types for the on-surface context in the hierarchical framework;

transmitting the request message to a server system;

receiving, from the server system, a response to the request message that includes one or more media content items selected based on information included in the hierarchical framework of the request message; and providing, to the media application at the client device, at least one of the one or more media content items within at least one of the media placement opportunities.

14. A method comprising, at a server system, the server system having one or more processors and memory storing instructions for execution by the one or more processors:

receiving, from an electronic device, a request message that includes an indication of each media placement opportunity of one or more media placement opportunities for a media application at a client device, wherein the request message has a hierarchical framework with a plurality of levels that includes, for each media placement opportunity:

(i) a media application context level identifying whether the media placement opportunity is within an in-stream context of the media application or an on-surface context of the media application;

(ii) a sub-context level identifying a content type of a plurality of possible content types for the respective context identified by the media application context level, wherein the plurality of possible content types for the in-stream context in the hierarchical framework is different from the plurality of possible content types for the on-surface context in the hierarchical framework;

identifying one or more media content items based on information included in the hierarchical framework of the request message for at least one media placement opportunity of the one or more media placement opportunities; and transmitting a response to the request message that includes, for at least one media placement opportunity of the one or more media placement opportunities indicated in the request message, at least one media content item of the one or more media content items identified based on the information included in the hierarchical framework of the request message.

15. The method of claim 14, wherein identifying the one or more media content items based on the information included in the hierarchical framework of the request message for the at least one media placement opportunity includes determining a type of media content based on the information included in the hierarchical framework.

16. The method of claim 14, wherein the electronic device comprises the client device.

17. The method of claim 14, wherein the electronic device comprises a server in the server system.

18. The method of claim 14, wherein:

a respective media placement opportunity of the one or more media placement opportunities corresponds to a first type of media placement opportunity; and identifying the one or more media content items based on the information included in the hierarchical framework of the request message for the respective media placement opportunity includes identifying respective media content items of a first type corresponding to the first type of media placement opportunity.

19. The method of claim 18, wherein the respective media placement opportunity corresponds to a first type of media placement opportunity is identified by the sub-context level of the request message.

20. The method of claim 18, wherein identifying the one or more media content items based on the information included in the hierarchical framework of the request message for the respective media placement opportunity further includes identifying respective media content items of a second type, distinct from the first type, that correspond to the first type of media placement opportunity.

21. The method of claim 14, wherein transmitting the response to the request message includes transmitting two or more media content items of the one or more media content items; and the electronic device selects a subset, less than all, of the two or more media content items to provide within a second respective media placement opportunity of the one or more media placement opportunities.

22. The method of claim 14, wherein the at least one media content item of the one or more media content items identified for a third respective media placement opportunity of the one or more media placement opportunities is provided at the electronic device while the electronic device is providing another media content item, while playback of the other media content item is paused or immediately after the other media content item.

23. The method of claim 14, further including:

receiving an indication that two or more media placement opportunities are available at a client device associated with a user; and in response to receiving the indication that two or more respective media placement opportunities are available, providing the at least one media content item of the one or more media content items identified for each of the two or more respective media placement opportunities to the client device.

24. The method of claim 14, wherein the plurality of levels of the request message having the hierarchical framework further includes, for each media placement opportunity, (iii) one or more description levels for additional information associated with the media placement opportunity.

\*    \*    \*    \*    \*